(12) United States Patent
Kirschner et al.

(10) Patent No.: US 10,318,146 B2
(45) Date of Patent: Jun. 11, 2019

(54) CONTROL AREA FOR A TOUCH SCREEN

(75) Inventors: Douglas R. Kirschner, Seattle, WA (US); Brett David Humphrey, Seattle, WA (US); Paul J. Reid, Woodinville, WA (US); Matthew B. Karr, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 852 days.

(21) Appl. No.: 13/230,561

(22) Filed: Sep. 12, 2011

(65) Prior Publication Data

US 2013/0067397 A1    Mar. 14, 2013

(51) Int. Cl.
*G06F 3/0488* (2013.01)

(52) U.S. Cl.
CPC ................ *G06F 3/04883* (2013.01)

(58) Field of Classification Search
CPC .... G06F 3/0481; G06F 3/0485; G06F 3/0483; G06F 2203/04808; G06F 3/0488; G06F 3/04886; G06F 3/04845; G06F 3/0416; G06F 2203/04104; G06F 3/048; G06F 2203/04108; G06F 2203/04803; G09G 5/14; A63F 13/12
USPC ........................................................ 715/799
See application file for complete search history.

(56) References Cited

U.S. PATENT DOCUMENTS

| | | |
|---|---|---|
| 5,075,673 A | 12/1991 | Yanker |
| 5,896,132 A | 4/1999 | Berstis et al. |
| 6,683,628 B1 * | 1/2004 | Nakagawa et al. ........... 715/799 |
| 6,903,723 B1 * | 6/2005 | Forest ........................... 345/157 |
| 7,274,377 B2 | 9/2007 | Ivashin et al. |
| 7,415,676 B2 * | 8/2008 | Fujita ............................ 715/781 |
| 7,519,920 B2 * | 4/2009 | Jarrett et al. .................. 715/785 |
| 7,698,653 B2 * | 4/2010 | Roman et al. ................ 715/798 |
| 8,089,778 B2 * | 1/2012 | Wang et al. .................. 361/796 |
| 2004/0070612 A1 * | 4/2004 | Sinclair et al. ............... 345/762 |
| 2004/0135824 A1 * | 7/2004 | Fitzmaurice .................. 345/856 |

(Continued)

FOREIGN PATENT DOCUMENTS

| | | |
|---|---|---|
| CN | 101326482 A | 12/2008 |
| CN | 101739127 A | 6/2010 |

(Continued)

OTHER PUBLICATIONS

Floatbox Options Reference for the current version 4.27, downloaded Aug. 12, 2011, http://randomous.com/floatbox/options , 14 pages.

(Continued)

*Primary Examiner* — Stella Higgs

(57) ABSTRACT

A touch screen computing device with an easy to use user interface. The computing device provides on the touch screen a control area associated with a content viewing area. Touch inputs that initiate in the control area, even if they extend into the viewing area, are interpreted as commands that manipulate the display of content. Other touch inputs are interpreted as interactions with displayed content. The control area may be formatted to allow easy access by a user holding the computing device. Through such an interface the user may input commands specifying direct manipulation of the content, without frustration that can occur from the computing device incorrectly interpreting those commands as interaction with the content.

18 Claims, 8 Drawing Sheets

(56) References Cited

U.S. PATENT DOCUMENTS

| | | | |
|---|---|---|---|
| 2005/0012723 A1* | 1/2005 | Pallakoff | 345/173 |
| 2005/0024322 A1* | 2/2005 | Kupka | 345/156 |
| 2005/0198592 A1* | 9/2005 | Keely et al. | 715/863 |
| 2006/0026521 A1* | 2/2006 | Hotelling et al. | 715/702 |
| 2006/0238517 A1* | 10/2006 | King et al. | 345/173 |
| 2007/0139372 A1* | 6/2007 | Swanburg et al. | 345/156 |
| 2007/0291014 A1* | 12/2007 | Layton | G06F 3/03547 345/173 |
| 2008/0040693 A1 | 2/2008 | Toyama et al. | |
| 2008/0129712 A1* | 6/2008 | Nguyen | 345/179 |
| 2008/0168403 A1* | 7/2008 | Westerman et al. | 715/863 |
| 2008/0204476 A1* | 8/2008 | Montague | G06F 3/04845 345/661 |
| 2008/0218524 A1* | 9/2008 | Takagi | 345/522 |
| 2008/0284738 A1* | 11/2008 | Hovden et al. | 345/173 |
| 2008/0297482 A1* | 12/2008 | Weiss | G06F 3/04883 345/173 |
| 2009/0091545 A1 | 4/2009 | Wang | |
| 2009/0228901 A1* | 9/2009 | Beaver et al. | 719/318 |
| 2009/0243998 A1* | 10/2009 | Wang | G06F 3/04883 345/156 |
| 2009/0259963 A1* | 10/2009 | Vyas et al. | 715/783 |
| 2009/0259967 A1* | 10/2009 | Davidson et al. | 715/799 |
| 2010/0056221 A1 | 3/2010 | Park | |
| 2010/0064261 A1* | 3/2010 | Andrews et al. | 715/863 |
| 2010/0077304 A1* | 3/2010 | Zaman et al. | 715/702 |
| 2010/0079493 A1* | 4/2010 | Tse et al. | 345/650 |
| 2010/0083111 A1* | 4/2010 | de los Reyes | 715/702 |
| 2010/0105443 A1* | 4/2010 | Vaisanen | 455/566 |
| 2010/0107116 A1* | 4/2010 | Rieman | G06F 3/0488 715/784 |
| 2010/0229130 A1* | 9/2010 | Edge et al. | 715/863 |
| 2010/0253620 A1* | 10/2010 | Singhal | G06F 3/0488 345/157 |
| 2011/0078560 A1* | 3/2011 | Weeldreyer | G06F 17/214 715/255 |
| 2011/0078624 A1* | 3/2011 | Missig | G06F 3/04883 715/802 |
| 2011/0113387 A1* | 5/2011 | Yoshimi | 715/856 |
| 2011/0122077 A1* | 5/2011 | Choi | G06F 3/0481 345/173 |
| 2011/0128244 A1 | 6/2011 | Cho | |
| 2011/0205163 A1* | 8/2011 | Hinckley et al. | 345/173 |
| 2011/0209097 A1* | 8/2011 | Hinckley et al. | 715/863 |
| 2011/0209098 A1* | 8/2011 | Hinckley et al. | 715/863 |
| 2011/0209100 A1 | 8/2011 | Hinckley | |
| 2011/0316888 A1* | 12/2011 | Sachs | G06F 1/1626 345/667 |
| 2012/0066591 A1* | 3/2012 | Hackwell | 715/702 |
| 2012/0151406 A1* | 6/2012 | Oberstein | G06F 3/0485 715/784 |
| 2013/0016129 A1* | 1/2013 | Gossweiler, III | G06F 3/012 345/667 |

FOREIGN PATENT DOCUMENTS

| | | |
|---|---|---|
| CN | 102122230 A | 7/2011 |
| JP | 2010-160581 | 7/2010 |
| WO | WO 2007/069835 | 6/2007 |
| WO | 2011/103218 A2 | 8/2011 |

OTHER PUBLICATIONS

Input Overview .NET Framework 4, downloaded Aug. 12, 2011, http://msdn.microsoft.com/en-us/library/ms754010.aspx, 19 pages.

Johnson et al., "A Collection of Papers from FirstPerson, Inc.," FirstPerson Technical Report FP-1994-1, Sun Microsystems Laboratories, Inc., Aug. 1995, 90 pages, downloaded Aug. 12, 2011, http://labs.oracle.com/technical-reports/1995/smli_tr-95-41.pdf.

PCT International Search Report and Written Opinion for Application No. PCT/US2011/055585, dated Sep. 27, 2012.

CN First Office Action and Search Report for Application No. 201210335485.0, dated Jul. 11, 2014.

CN Notification to Grant Patent Right for Invention for Application No. 201210335485.0, dated Mar. 27, 2015.

* cited by examiner

CONTROL AREA FOR A TOUCH SCREEN

BACKGROUND

In recent years, computing devices equipped with "touch screens" have proliferated. A touch screen displays information for viewing by a user, such as outputs from an operating system or application executing on the computing device. A touch screen also serves as an input device, and can receive inputs via touches of the screen. The inputs may represent commands to the operating system, including commands to alter the display, or commands to an application providing information for display. The touch screen therefore enables a user to alter a display or interact with an application via touch.

Frequently, a user provides a touch input using a digit, such as a finger or a thumb, on one hand. Though, a user may provide input to the touch screen using any touch instrument, including a digit or a stylus A computing device with a touch screen may be configured to recognize different types of touches, each characterized by a different pattern of contact with the touch screen. A touch's contact with the touch screen may include motion across the surface of the touch screen. For example, a "swipe" is a touch comprising an initial contact with the touch screen and a subsequent motion across the touch screen. Swipes include "drags" and "flicks." "Drags" include relatively slow swipes and any swipes in which, after beginning the motion across the touch screen, the touch instrument stops moving (or decelerates to a low a speed) before losing contact with the touch screen. "Flicks" include relatively fast swipes.

A "pincer touch" is a touch comprising contact between the touch screen and multiple touch instruments, followed by movement of the touch instruments that changes the distance between the instruments' contact points with the screen. Pincer touches include "pinches" and "spreads." A "pinch" is a touch comprising contact between the touch screen and multiple touch instruments, followed by motion that decreases the distance between the contact points, such as movement of the touch instruments' tips toward each other. By contrast, a "spread" is a touch comprising contact between the touch screen and multiple touch instruments, followed by motion that increases the distance between the contact points, such as movement of the touch instruments' tips away from each other.

A "tap" is a brief touch comprising initial contact between the touch instrument and the touch screen followed by loss of contact before a threshold time period has elapsed, without substantial intervening motion.

A "press" is akin to a tap, but with contact of longer duration. In particular, a press is a touch comprising initial contact between the touch instrument and the touch screen followed by loss of contact after a threshold time period has elapsed, without substantial intervening motion.

A computing device equipped with a touch screen may interpret some touch inputs as user commands to directly manipulate the display. "Direct manipulation" refers to a touch input that causes the computing device to alter the display in a way that responds to motion of the touch instrument(s)' contact point(s) across the screen.

In some direct manipulations, the displayed content will change in direct proportion to motion(s) of the contact points(s). For example, direct manipulation includes a pinch that reduces the magnification of the displayed content or a spread that increases the magnification of the displayed content. Direct manipulation also includes a drag that moves in a given direction across the touch screen and causes the displayed content to "pan" in the same direction and in correspondence to the contact point(s)' motion.

Though, a flick that causes the displayed content to pan in the same direction as the contact point(s)' movement and to continue panning after the touch instrument(s) lose contact with the touch screen ("panning with inertia") is also a direct manipulation. In this case, the distance that the content pans and/or the duration of the period during which the content pans may be related to the speed (rather than the distance) of the contact point(s)' movement across the screen.

A touch may represent different commands to different applications. For example, in an image-editing application, a drag may correspond to a command to draw a curve from the starting point of the drag to the ending point of the drag. Likewise, dragging may signify selection of text to a word processing or web browsing application, while the same motion may signify navigational commands to a video game.

Various interfaces for altering the display of a touch screen have been proposed. For example, some applications allow the user to alter the display by touching a scroll bar or a navigational button associated with an application. Some devices allow the user to magnify at least a portion of the display by pressing a portion of the display or by tapping three touch instruments on the display.

SUMMARY

The inventors have recognized and appreciated that an improved user experience for a computing device with a touch screen interface may be provided by displaying a control area and a viewing area on the touch screen. The device may display a portion of content in the viewing area. The device may further distinguish touch inputs that begin in the control area from touch inputs that begin in the viewing area. A touch input that begins in the control area and subsequently moves across the touch screen may cause a direct manipulation of the content. A touch input that begins in the viewing area may cause an interaction with the content.

In some embodiments, the control area may be displayed as a frame that circumscribes the viewing area, or as bands disposed adjacent to two or more edges of the touch screen. Displaying the frame adjacent to a periphery of the content or a periphery of the touch screen may enable the user to hold the computing device while directly manipulating the content using a thumb of the same hand that is holding the computing device. Alternatively or additionally, the control area may be displayed in any other convenient shape and position on the touch screen.

The computing device may recognize a touch input that begins in the control area and includes a subsequent motion across the touch screen as a direct manipulation of the content displayed in the viewing area. In some embodiments, the device may pan the content in the viewing area in response to a drag or a flick. Additionally, the computing device may adjust the magnification of the content in the viewing area in response to a pinch or a spread.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
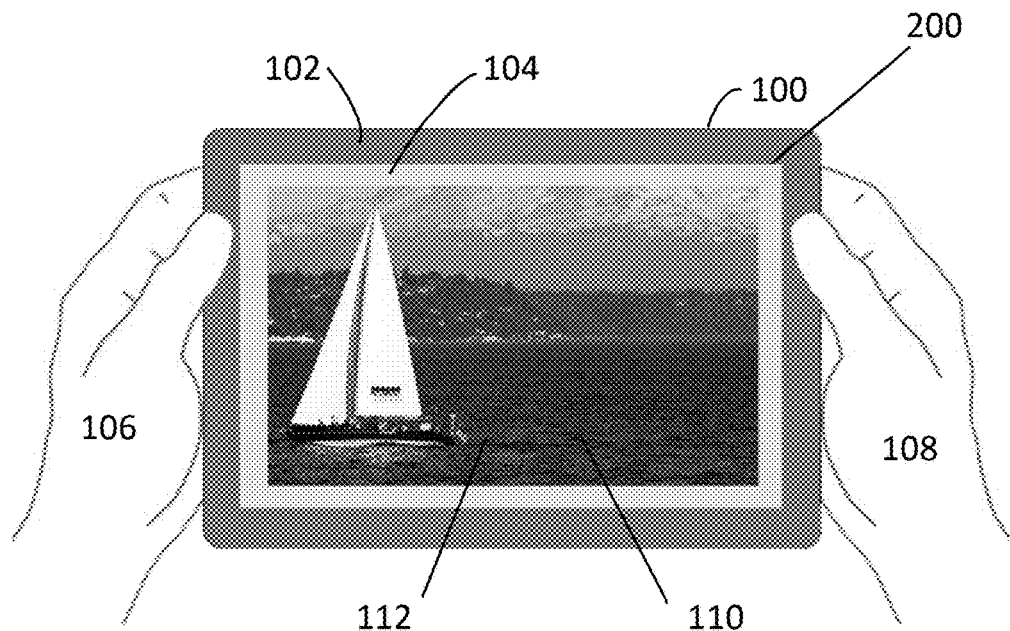
FIG. 1 is sketch of a user interacting with an exemplary embodiment of a touch screen computing device having a control area and a viewing area.

The display of interactive content on a touch screen presents challenges, particularly when the dimensions of the content exceed the dimensions of the touch screen. The inventors have recognized and appreciated that a user experience for a user of a touch screen computing device can be improved by configuring the computing device to support a separate control initiation area ("control area") and content viewing area ("viewing area"). The inventors have recognized and appreciated that conventional touch screen interfaces may inaccurately distinguish between touch inputs intended as interactions with displayed content and touch inputs intended as commands to affect the display of content. As a result, the computing device responds in an unexpected way, which can be source of user frustration.

Moreover, the inventors have recognized and appreciated that conventional approaches that require display manipulation commands to be made using specifically designed types of touch inputs may be difficult to use or may significantly limit the range of commands that can be recognized by a computing device. For example, limiting commands to those that can be provided through a button or static control may reduce the range of commands. Requiring that commands be made with special touch patterns, motions, or gestures, such as contacting three fingers on the display simultaneously, may be inconvenient, non-intuitive for a user, and difficult for a user to make while holding a computing device.

Accordingly, user frustration may be reduced by equipping a touch screen computing device with a means for a user to easily and unambiguously indicate to the computing device whether a touch is intended as interaction with the content or as a manipulation of the content. In some embodiments, the mechanism may be provided through a control area, separate from a viewing area, on the touch screen. The computing device may classify touch inputs to differentiate, based on their trajectories relative to the control area, commands to manipulate the display of content from interactions with content. In some embodiments, an initial touch location, relative to the control area, may be used to discriminate between such commands and interactions. As a specific example, a touch input that has an initial touch location within the control area may be regarded as a command to manipulate the display of content. In contrast, a touch input that includes an initial touch location within the viewing area, or otherwise outside of the control area, may be regarded as interaction with the displayed content.

In some embodiments, the computing device can differentiate between scenarios in which a touch input represents a command to manipulate the display of content and scenarios in which a touch input represents an interaction with the content. This approach may be useful for commands that involve motion across the touch screen. These motions may be recognized as commands to manipulate the display of content, even though some portion of the motion passes over the viewing area. These motions may encompass swipes, such as drags and flicks, pincer motions, such as pinches and spreads, or any other suitable motion. Such motions are simple for a user to make and intuitively understand. Though these motions may be used to specify interaction with content generated by applications or other components, the same motions can be used as commands to manipulate the display of content. When used as commands to manipulate the display of content, the computing device may interpret these motions in any suitable way. For example, the computing device may interpret these motions as commands relating to a panning operation, a magnification operation or any other suitable operation. Panning operations may be particularly useful when the dimensions of the content exceed the dimensions of the viewing area, such that only a portion of the content can be displayed in the viewing area. Panning comprises displaying an alternative portion of the content in the display area.

In some embodiments a "panning" operation causes the viewing area to function as a viewport through which a portion of the content is visible, with the motion of the touch instrument controlling the direction in which the content moves relative to the viewport. For example, panning the content upward relative to the viewport causes the computing device to display a portion of the content not previously visible along a bottom edge of the viewing area, while ceasing to display a portion of the content previously visible along a top edge of the viewing area.

Magnification operations include "zooming in" and "zooming out." In some embodiments, zooming in refers to increasing a magnification of a content, while zooming out refers to decreasing a magnification of a content In some embodiments, the commands that manipulate the display of content may be processed by a different component within the computing device than the component providing content. The commands may be processed within the operating system of the computing device. For example, the operating system may provide a viewer component that receives content from an application or other source and displays at least a portion of that content on the touch screen.

The viewer component may respond to commands, such as commands relating to panning operations and magnification operations, that impact which portions of the content are displayed and how they are displayed. Such viewer components are known in the art and a viewer component as described herein may be implemented using known techniques. Though, a viewer component may be configured to respond to any suitable touch inputs, whether now known or hereafter discovered, that may act as commands.

In some embodiments, such a viewer component may interface to the touch screen through an interface component that distinguishes between touch inputs constituting commands to manipulate the display of content and touch inputs constituting interactions with content. That touch screen interface may route touch inputs representing manipulation commands to the viewer component. In contrast, touch inputs representing interactions with the content may be routed to an application or other component acting as a source of the content. In addition, such an interface component may also render a control area.

Such an interface component may be implemented in a computing device configured in any suitable way. FIG. 1 is an illustration of a computing device 100 configured to operate an embodiment of the invention. In some embodiments, the computing device 100 may be a smart phone, tablet, slate, or other mobile device. However, the invention is not limited to mobile devices.

In the example of FIG. 1, computing device 100 includes a touch screen 200 and a border 102. In some embodiments, the border 102 is a region of the computing device that does not display output and is not responsive to touch inputs. A user may touch the computing device on the border 102 without obscuring any outputs or providing any inputs. Thus, the border 102 may be useful for holding the computing device. FIG. 1 illustrates a scenario in which a user is holding the computing device with a left hand 106 and a right hand 108, such that the thumbs of each hand rest on the border 102. Nevertheless, the invention is not limited to computing devices 100 that include a border 102.

The computing device 100 displays a viewing area 110 on the touch screen 200. The viewing area 110 displays at least a portion 112 of content. In the example of FIG. 1, the content is an image of a sailboat floating in a body of water, with foothills in the near background, mountains in the distant background, and the sky visible above the mountain peaks. The nature and source of such content is not critical to the invention. The content, for example, may be a still image or may be video material. The content may be generated by an application or obtained from any suitable source. The content may be active or static. Active content, for example, may be generated by an application that is configured to receive user inputs in connection with one or more locations in the content and respond to those inputs. Such applications are known such that the content may be generated using conventional techniques or in any other suitable way.

Moreover, the content may be of any suitable size. In the scenario illustrated, the content includes more information than fits in the viewing area. Accordingly, the portion 112 of the content visible in the viewing area may include only a small part of the entire content such that commands to manipulate the display of content may result in different or additional content being displayed.

Figure 7:
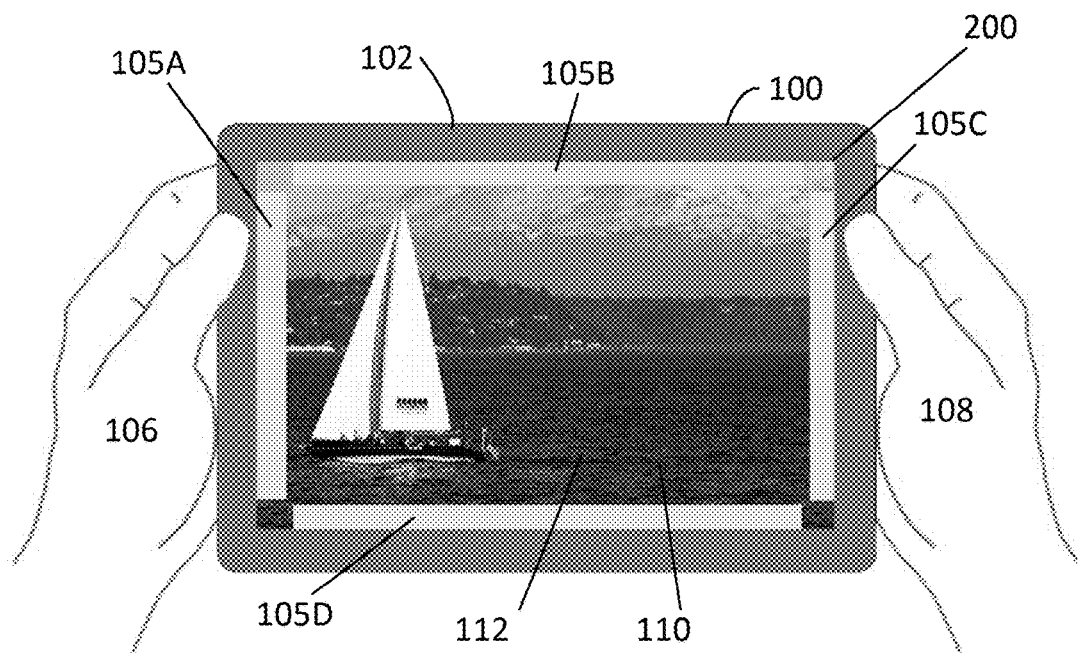
FIG. 7 is a sketch of a user interacting with a second exemplary embodiment of a touch screen computing device having a control area and a viewing area.
Figure 8:
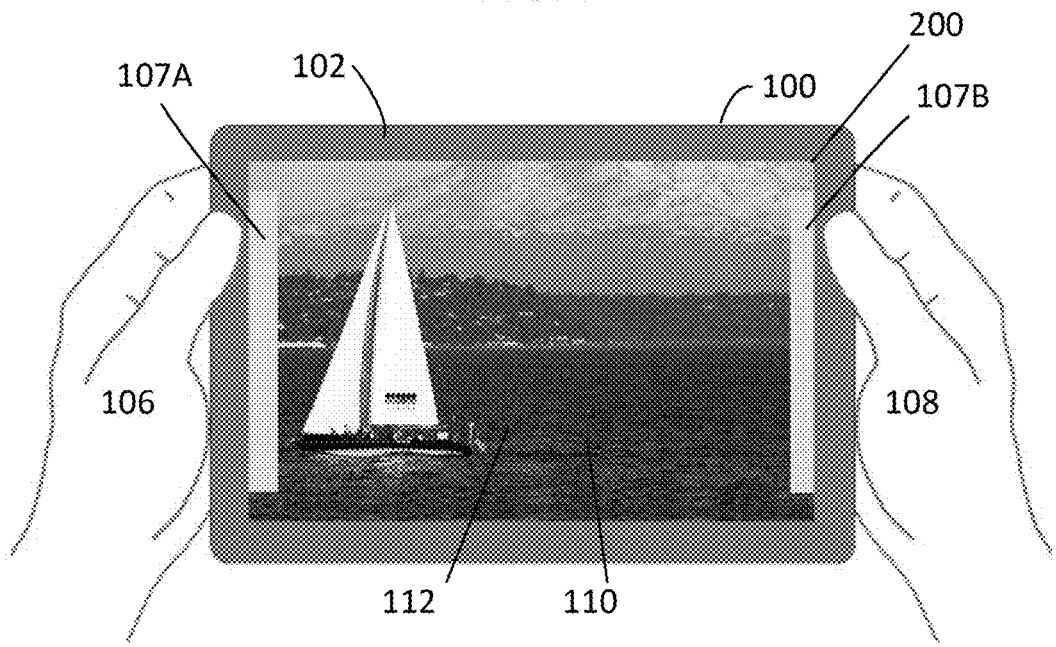
FIG. 8 is a sketch of a user interacting with a third exemplary embodiment of a touch screen computing device having a control area and a viewing area.
Figure 9:
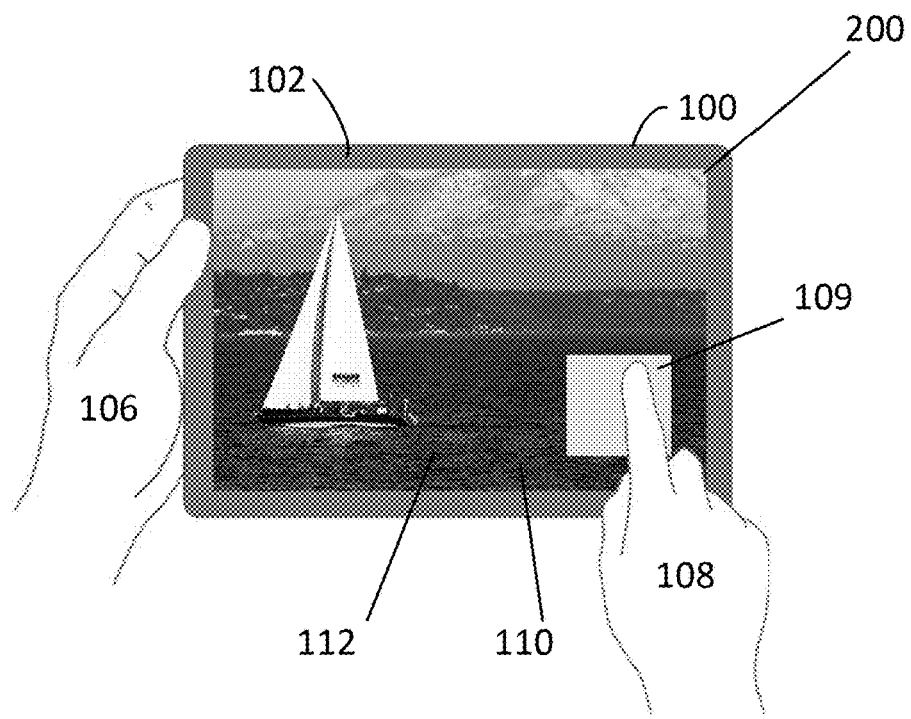
FIG. 9 is a sketch of a user initiating a pan command on a touch screen computing device having a control area and a viewing area according to a fourth exemplary embodiment.
Figure 10:
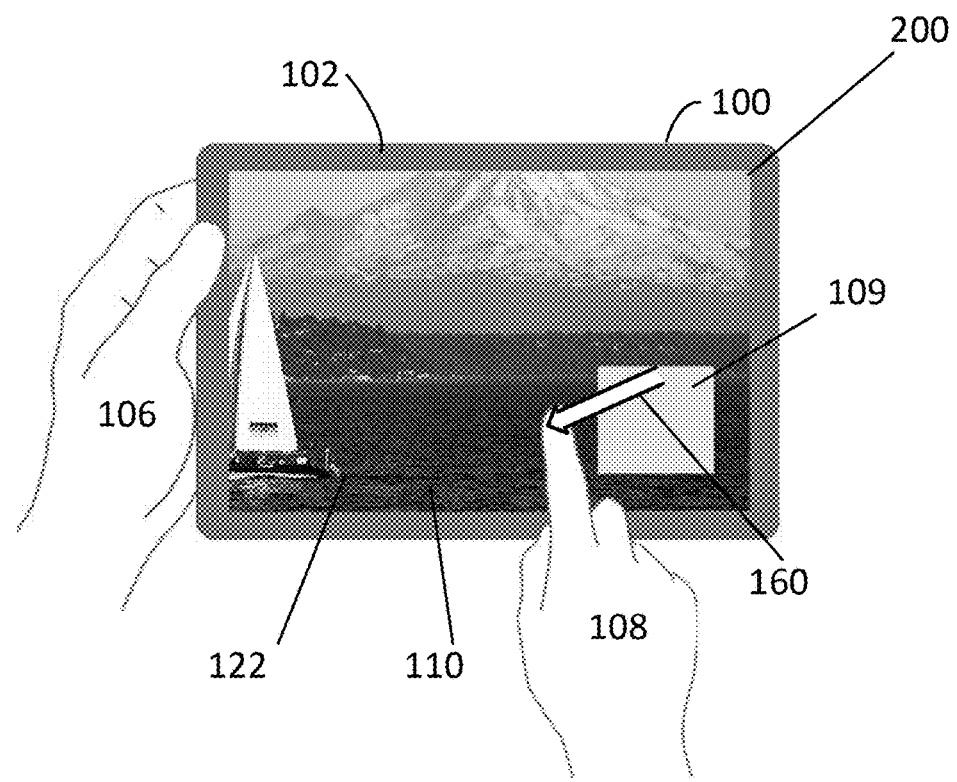
FIG. 10 is a sketch of a user completing the pan command on the touch screen computing device of FIG. 9.

The computing device 100 further displays a control area 104 on the touch screen 200. In some embodiments, the control area 104 is displayed as a frame that circumscribes the viewing area 110. Nevertheless, the control area 104 may assume any shape or position on the touch screen 200. FIGS. 7-9, discussed below, depict embodiments of the control area 104 in which the control area 104 assumes alternative shapes and positions.

Figure 2:
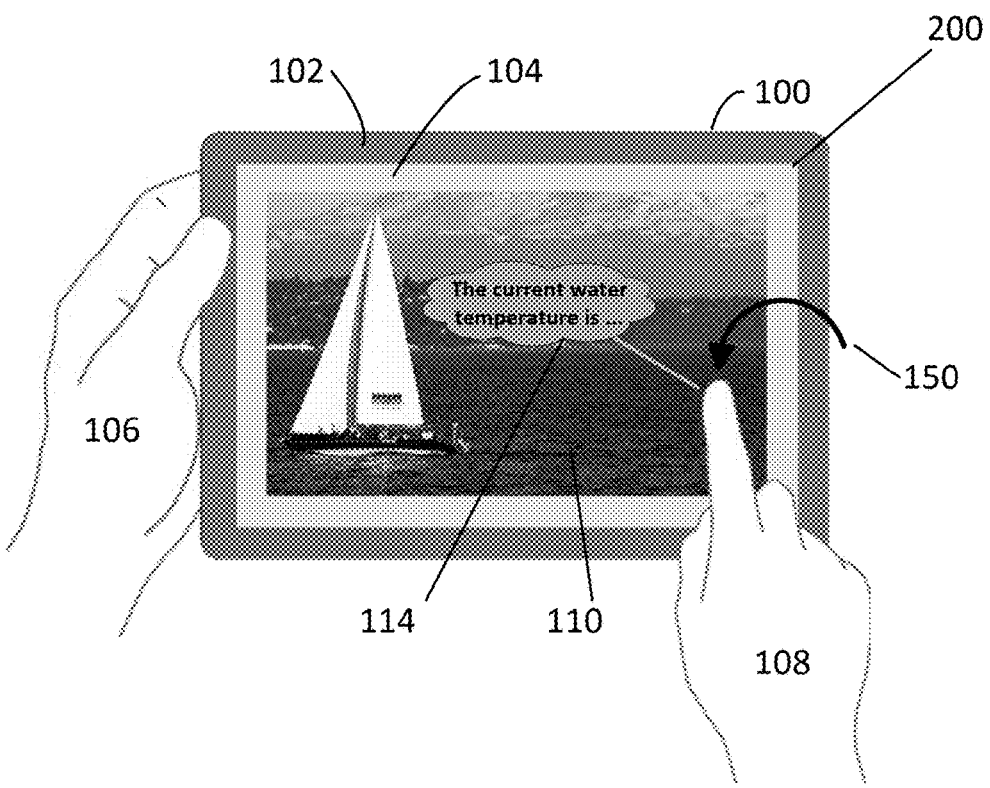
FIG. 2 is a sketch of a user interacting with content displayed on the touch screen computing device of FIG. 1.

FIG. 2 illustrates user interaction with the portion 114 of the content in the viewing area 110. In FIG. 2, the user is touching the viewing area 110 with a finger of the right hand 108. As the animation arrow 150 shows, the user has moved the finger of the right hand 108 from the border 102 to the viewing area 110 without touching the control area 104. Thus, in FIG. 2, the user's touch input comprises an initial contact in the viewing area 110.

Such a touch input may be interpreted by the computing device as an interaction with the content. Accordingly, in response to this touch input, the computing device 100 has updated the portion 114 of the content in the viewing area 110 to display an indication of the water temperature associated with the body of water visible in the portion 114 of the content. Though, it should be appreciated that this response is merely an example of a response to an interaction with displayed content. The specific response to an interaction with the content is not critical to the invention. In any given scenario, whether the computing device responds to an interaction with the content and what that response is may depend on programming of an application or other component that generates the content and/or responds to command representing interactions with the content.

In some embodiments, when a touch comprises an initial contact in the viewing area 110 that is displaying a portion 114 of content, the computing device 100 provides the touch input to the application that provided the content. That is, the computing device process such a touch input as an interaction with the application providing the displayed content. For example, if the touch screen detects a touch input comprising initial contact in the viewing area 110 and subsequent motion across the touch screen, the computing device 100 provides the touch input to the application, even if the subsequent motion includes motion within the control area 104. The application may ignore the touch input or perform processing consistent with the touch input, such as updating the content in response to the touch input, in accordance with the application's programming.

In contrast, other types of inputs may be processed by the computing device as commands to manipulate the display of content. FIGS. 3-6 illustrate direct manipulation in accordance with some exemplary embodiments of the invention. In some embodiments, when a touch input comprises an initial contact in the control area 104, the computing device may process the touch input as a command to manipulate the display of content. In scenarios in which the touch input includes subsequent motion across the touch screen 200, the computing device 100 may process the entire touch input as a command to manipulate the display of content, even if the motion extends into the viewing area. In some embodiments, such a touch input with an initial contact in the control area and subsequent motion may be processed as a direct manipulation of the content displayed in the viewing area. The direct manipulation may, for example, alter the appearance or manipulate the presentation of the content displayed in the viewing area.

Figure 3:
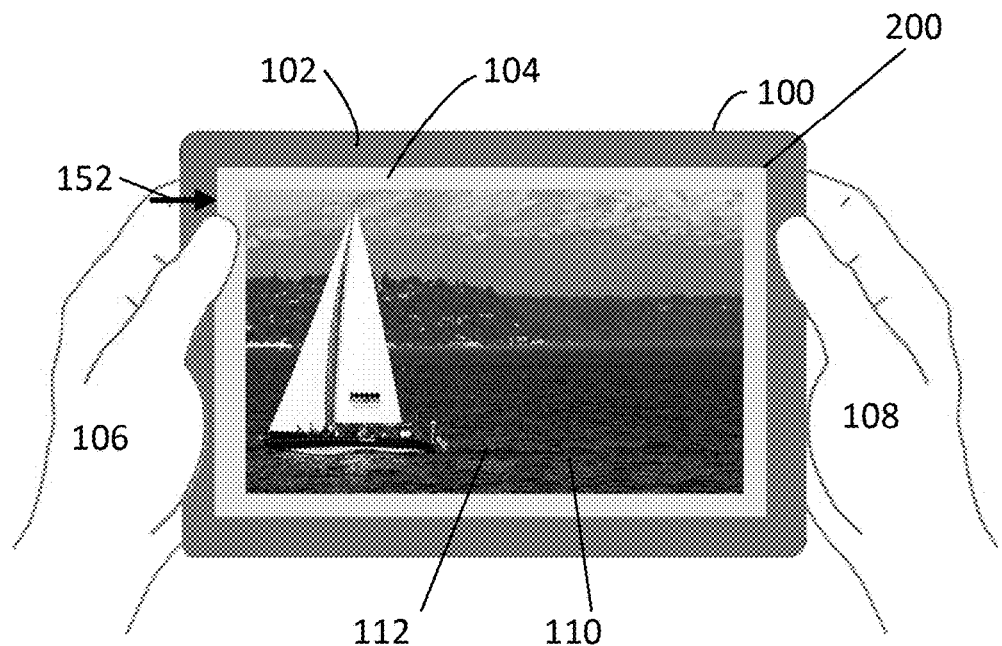
FIG. 3 is a sketch of a user initiating a pan command on the touch screen computing device of FIG. 1.
Figure 4:
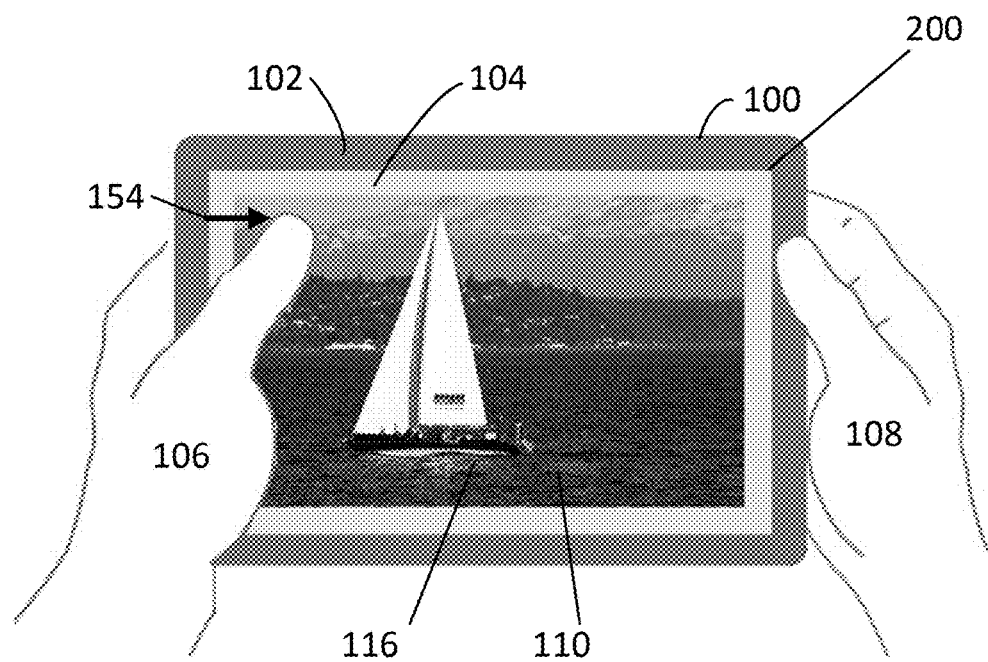
FIG. 4 is a sketch of a user completing the pan command illustrated in FIG. 3.

FIGS. 3 and 4 illustrate panning by direct manipulation using a control area. FIG. 3 illustrates a user touching the control area 110 of the touch screen 200 with a thumb of the left hand 106. As the animation arrow 152 shows, the user has moved the thumb of the left hand 106 from the border 102 to the control area 104 without touching the viewing area 110. As a result, the initial contact is in the control area 104.

FIG. 4 is a further illustration of the input touch initiated in FIG. 3. In FIG. 4, the user has moved the thumb of the left hand 106 from the control area 104 to the viewing area 110. Thus, the user's touch input comprises an initial contact in the control area 104 (FIG. 3) and a subsequent motion across the touch screen 200 (FIG. 4). In this example, the subsequent motion extends into the viewing area. Nonetheless, the touch input is interpreted as a command to manipulate the display of content.

FIG. 4 depicts a direct manipulation in which the touch input is a swipe and the display alteration is a panning operation. In FIG. 4, a thumb of the user's left hand 106 has made initial contact with the touch screen 200 in the control area 104 and subsequently moved from left to right while maintaining contact with the touch screen 200. This touch input is a swipe. Because the user initiated the swipe in the control area 104, the touch input represents a direct manipulation command. In response, the content displayed in the viewing area 110 pans from left to right. Though, it should be appreciated that a swipe and a pan are just examples of a touch input and a manipulation, respectively, and any suitable touch inputs may be associated with any suitable manipulations.

When the user performs the swipe motion relatively slowly or substantially stops moving the touch instrument in contact with the touch screen 200 before separating it from the touch screen 200, as in FIG. 4, the touch input is a drag. In some embodiments, when the user performs a drag that begins in the control area 104, the computing device 100 pans the content displayed in the viewing area 110, and the panning occurs without inertia. Such panning commands are known in the art, and any suitable speed threshold and other criteria may be used to identify motion that correlates with a pan without inertia. Accordingly, techniques as are known in the art to differentiate a "drag" and a "flick" may be used.

In some embodiments, when the computing device 100 pans the content without inertia, the movement of the content relative to the viewing area 110 roughly matches the movement of the touch instrument along the surface of the touch screen 200 in both direction and distance. In FIG. 4, the user's thumb has moved a certain distance from left to right. A comparison of the portion 116 of the content visible in the viewing area of FIG. 4 and the portion 112 of the content visible in the viewing area of FIG. 3 indicates that the content has panned from left to right roughly the same distance that the user's thumb moved.

By contrast, when the user performs the swipe motion relatively quickly, the manipulation touch is a flick. In some embodiments, when the user performs a flick that begins in the control area 104, the computing device 100 pans the content displayed in the viewing area 110, and the panning occurs with inertia.

In some embodiments, when the computing device 100 pans the content with inertia, the movement of the content relative to the viewing area 110 roughly matches the movement of the touch instrument along the surface of the touch screen 200 in direction, but not in distance. Rather, the distance of the content's movement relative to the viewing area 110 exceeds the distance of the movement of the touch instrument. The amount by which the content is panned, for example, may depend on the speed of motion. Though, in some embodiments, a flick or other touch input may be interpreted as a command to pan in the direction of the flick until reaching the edge or limit of the content in the direction of the panning.

Figure 5:
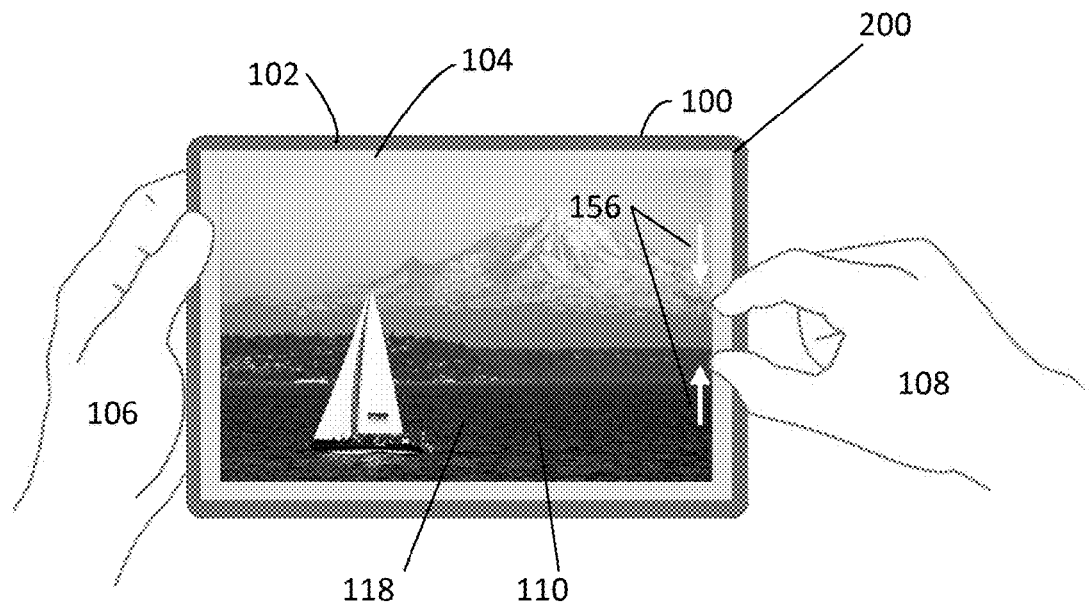
FIG. 5 is a sketch of a user providing a pinch command on the touch screen computing device of FIG. 1.
Figure 6:
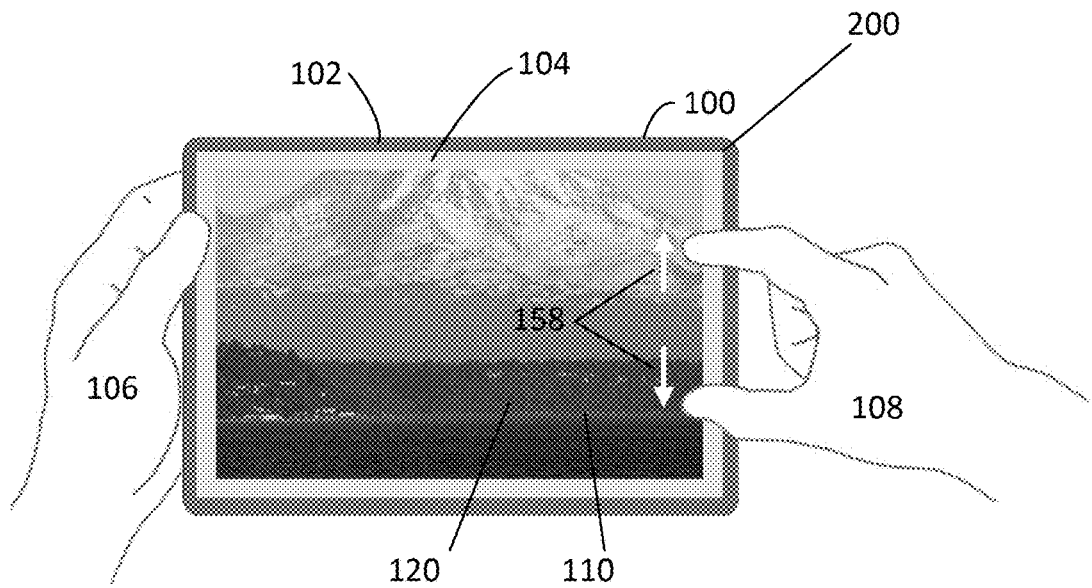
FIG. 6 is a sketch of a user completing a spread command on the touch screen computing device of FIG. 1.

FIGS. 5 and 6 illustrate other touch inputs that a touch screen computing device may be configured to recognize. These figures show changes in magnification in response to pincer touches in accordance with some embodiments of the invention. In some embodiments, when the user performs a pincer movement as part of an input touch that begins in the control area 104, the computing device 100 manipulates presentation of the content in the viewing area 110 by altering a magnification of the content in the viewing area 110 in response to the pincer touch input.

In this specific example, FIG. 5 depicts a direct manipulation in which the input touch is a pinch and the display alteration comprises zooming out. In FIG. 5, the user touches the control area 110 of the touch screen 200 with two fingers of the right hand 108. As the animation arrows 156 show, the user initiates the input touch in the control area 104 and subsequently moves the two fingers in a manner that decreases the distance between their contact points. This touch input is a pinch. In response, the computing device 200 zooms out, such that the magnification of the content in the viewing area 110 decreases.

In some embodiments, when the user performs a pinch motion that begins in the control area 104, the computing device alters the magnification of the content in the viewing area in response to the touch input by zooming out. The factor by which the magnification decreases during a zooming out operation may be proportional to the ratio of the distances between the user's fingers at the end and the beginning of the pinch motion or may be proportional to the distance the user's fingers move during the pinch. Though, it should be recognized a computing device may respond to a touch input identified as a command in any suitable way.

FIG. 6 depicts a direct manipulation in which the input touch is a spread and the display alteration comprises zooming in. In the specific example of FIG. 6, the user touches the control area 110 of the touch screen 200 with two fingers of the right hand 108. As the animation arrows 158 show, the user initiates the input touch in the control area 104 and subsequently moves the two fingers in a manner that increases the distance between their contact points. This touch input is a spread. In response, the computing device 200 zooms in, such that the magnification of the content in the viewing area 110 increases.

In some embodiments, when the user performs the spread motion that begins in the control area 104, the computing device alters the magnification of the content in the viewing area in response to the touch input by zooming in. The factor by which the magnification increases during a zooming in operation may be determined in any suitable way. For example, the amount of zoom may be proportional to the ratio of the distances between the user's fingers at the beginning and the end of the pinch motion or to the amount the user's fingers move across the screen during the pinch motion.

FIGS. 1-6 illustrated embodiments of a touch screen computing device in which the control area is positioned along the edges of a touch screen. In these embodiments, the touch screen has four sides, and the control area is adjacent each of the four sides. Such a configuration may allow a user to access the control area while holding the computing device. For example, the user may access the control area with a thumb to provide a pan operation. In addition, the user can easily access the control area regardless of the orientation with which the computing device is held.

However, it is not a requirement that the control area have this configuration. FIGS. 7-10 depict examples of additional embodiments of the control area. In FIG. 7, the control area comprises a plurality of bands 105A-D, each band being disposed adjacent an edge of the touch screen. Though, in this case, the bands do not extend the full length of each edge. Rather, the control areas extend for only a portion of the length of each edge. In the exemplary embodiment of FIG. 8, the control area comprises two portions 107A and 107B, a first of the two portions 107A is disposed along a first side of the touch screen and a second of the at least two portions 107B is disposed along a second side of the touch screen. In this example, the second side is opposite the first side.

Though, there is no requirement that the control areas be along an edge of the touch screen. In FIG. 9, the control area 109 comprises a region surrounded by the viewing area 110. In this example, the control area 109 is rectangular, but the invention is not limited to control areas that are rectangular. The control area may be circular, triangular, or any other shape, regular or irregular.

In some embodiments, the control area functions in the same manner irrespective of the shape or location of the control area. A touch input initiated in the control area may be regarded as a command to manipulate the display of content. Accordingly, in the embodiment illustrated in FIG. 10, the user pans the content displayed in the viewing area by initiating a touch in the control area 109 with a finger of the right hand 108 and dragging the finger from right to left and from top to bottom. In response to the user's touch input signifying a command for direct manipulation, the content displayed in the viewing area 110 pans from right to left and from top to bottom.

Figure 11:
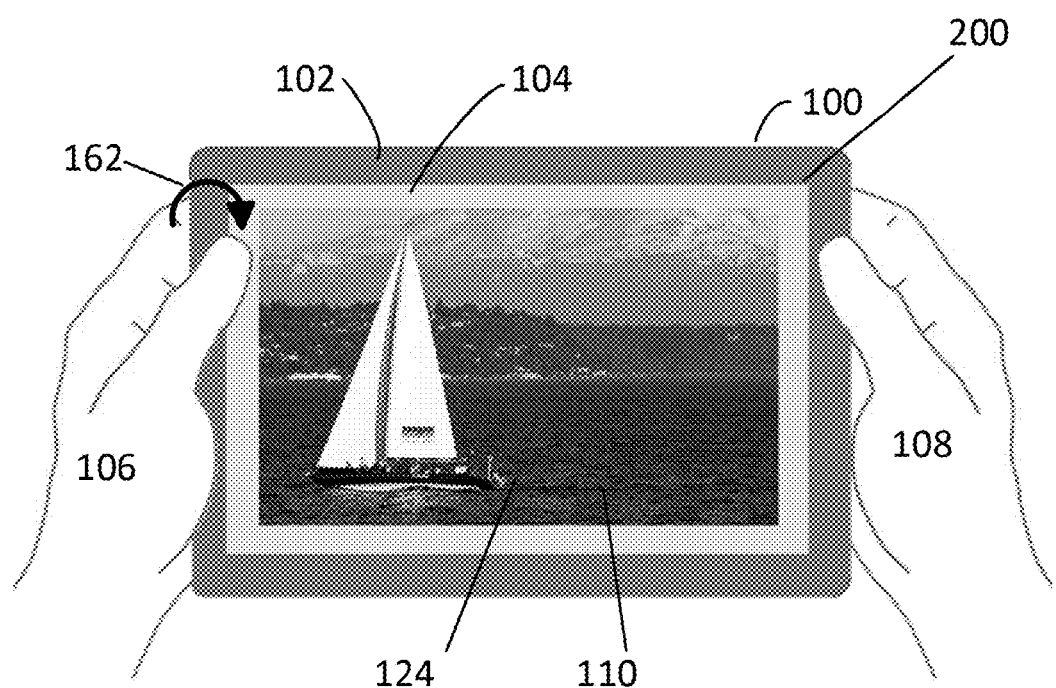
FIG. 11 is a sketch of a user performing a tap command on a touch screen computing device having a control area and a viewing area.

In some embodiments, the control area also supports manipulations of the viewing area other than direct manipulations. In FIG. 11, the computing device 100 pans the content displayed in the viewing area 110 from left to right in response to the user tapping the left side of the frame-shaped control area 104. A tap may be detected using techniques as are known in the art. However, the specific criteria used by a computing device to detect a tap in touch input are not critical to the invention.

Regardless of how a tap is identified, in some embodiments, the computing device 100 may pan the content from left to right when the user taps the frame's left side, from top to bottom when the user taps the frame's top side, from right to left when the user taps the frame's right side, and from bottom to top when the user taps the frame's bottom side. The distance covered by the panning operation in response to a tap may be fixed or configurable.

Additionally, in some embodiments the computing device 100 may pan the content displayed in the viewing area 110 in response to the user pressing a portion of the control area 104. A press may be detected using techniques as are known in the art. However, the specific criteria used by a computing device to detect a press in touch input are not critical to the invention. In response to detecting a touch input indicating a press, the computing device 100 pans the content for the duration of the press.

Furthermore, in some embodiments the computing device 100 may display one or more control buttons in the control area. A control button may specify a manipulation operation such as panning the content in a particular direction or altering a magnification of the content in the viewing area by zooming in. The computing device may manipulate the display of the content in the viewing area in accordance with a control button's specified operation when the user taps or presses the control button.

Figure 12:
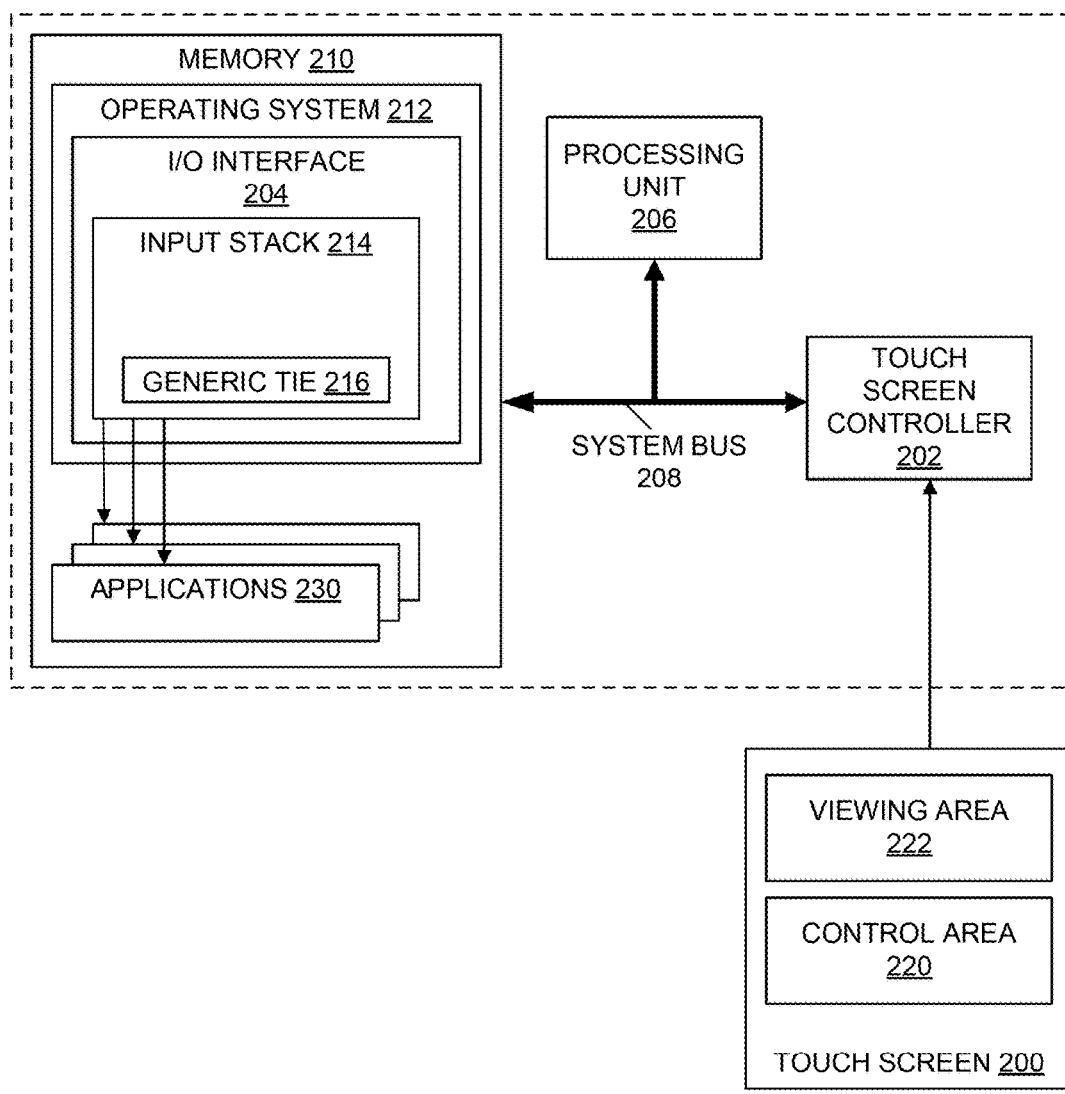
FIG. 12 is a schematic illustration of an exemplary computing device configured to implement an embodiment of the invention.

A touch screen computing device may be adapted in any suitable way to implement a user interface that supports a control area, as described herein. FIG. 12 is a block diagram of an exemplary embodiment of a computing device 200 that may perform such actions. The computing device 200 comprises a touch screen 200, a touch screen controller 202, a processing unit 206, and a memory 210 connected via a system bus 208. These components may be components as are known in the art or any other suitable components. These components may interact to control touch screen 200, also using techniques as are known in the art. For example, memory 210 may contain computer-executable instructions that, when executed by processing unit 206, generate information for display on touch screen 200.

In this example, touch screen 200 is shown schematically to include a viewing area 222 and a control area 220. Information defining both of these areas may be generated by execution of the computer executable instructions. In some embodiments, input/output (I/O) interface 204 within the operating system 212 may define the portions of the screen that, at any given time, act as a viewing area or a control area. Allocation of a viewing area 222 may be based on known techniques. Specifically, it is known that an operating system may associate a portion of a computer screen with an application program, such as one of applications 230, or other executing component.

Such an association may be provided through an I/O interface 204. Such an interface may receive requests form applications, or other executing components, to display content and perform other functions, such as to change which application is associated with a viewing area or other otherwise control the presentation of information. In response to these requests, I/O interface 204 may access a display driver, graphics rendering components or other components within the computing device to generate control signals to touch screen 200 to cause the appropriate content to be displayed.

In addition, I/O interface 204 may be configured to receive content to display that exceeds the amount of content that can be displayed on a screen under applicable display parameters. In this scenario, I/O interface 204 may select only a portion of it to be displayed. Manipulation commands may be used to modify the portion displayed and/or other parameters of the content display, such as the magnification at which content is displayed. Though these commands may be provided from an application generating content, in some embodiments, the commands may alternatively or additionally be provided by a user through touch screen 200.

Accordingly, I/O interface 204 may be configured to display a control area in connection with display content. The control area may have any suitable format and may be displayed in connection with any suitable content. The control area may be generated in any suitable way. For example, displaying the control area may involve generating graphical content to depict bars or other stricture representing the control area.

I/O interface 204 also may receive and respond to touch inputs. As the touch screen 200 receives touch inputs from the user those inputs may be detected by touch screen controller 202. Within the I/O interface 204, those inputs may be processed in an input stack 214. Input stack 214 may have an architecture and interfaces as are known in the art for processing inputs and distributing those inputs to components that are the intended destinations of the inputs. In this example, the intended destination of the input may be one of applications 230 or may be the operating system 212. The intended destination of the input may depend on the nature of the touch input, which may also be determined in any suitable way.

In this example, input stack 214 includes one or more components that can identify, based on the output of the couch screen controller 202, the nature of touch input. Here, such a component is illustrated as a touch interface engine (TIE). The generic TIE 216 may preliminarily process a touch input before passing the touch input to a higher level component, which may be an application or may be another component within the operating system. The generic TIE 216 may link together detected contacts on the touch screen, at closely spaced locations and consecutive times, such that they may be recognized as a single touch input. The generic TIE's preliminary processing may also include classifying, using any suitable criteria, the touch input as a specific type of touch input, such as a swipe or a pincer motion, and identifying one or more parameters of that touch input. Such parameters may include, for example, the touch input's starting location, stopping location, speed and/or trajectory.

In some embodiments, the generic TIE's preliminary processing may include determining whether the touch input's initial contact occurred in the control area or in the viewing area. This determination may allow the generic TIE to determine whether to pass the touch input to the application supplying the content displayed in the viewing area or to the component responsible for controlling the display (such as the operating system or a viewer application). Based on this determination, a destination for each touch input may be determined. A destination, for example may be within I/O interface 204, an application or other component generating the content for the portion of the screen associated with the touch input. The input stack 214 may use this information to appropriately route the touch input for further processing.

Figure 13:
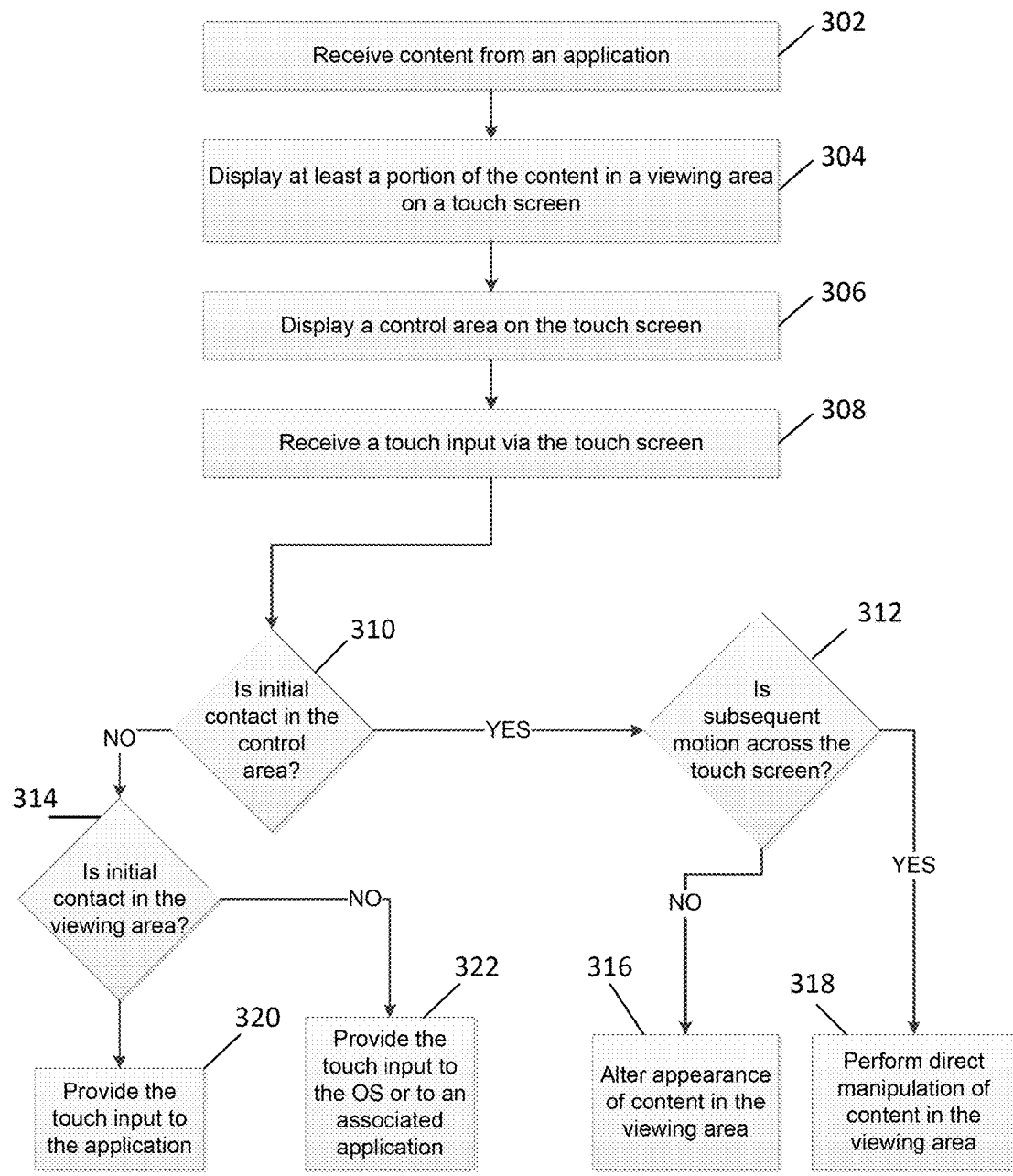
FIG. 13 is a flow chart of an exemplary process of displaying content on a touch screen and responding to touch inputs received via the touch screen.

Accordingly, components of a computing device may operate together to perform a method of operation of the computing device that allows a computer to interact with content and control display parameters. FIG. 13 depicts an exemplary method of displaying content on a computing device equipped with a touch screen. In this example, the method begins at act 302 with a computer receiving content from an application. At act 304 the computing device displays at least a portion of the content in the viewing area on a touch screen. The portion displayed may be selected in any suitable way. For example, in scenarios in which the content to be displayed would occupy more space on the screen than is allocated to the viewing area, the component rendering the display may select as much of a central portion of the content as does fit in the viewing area, taking into consideration a specified, or possibly a default, resolution for displaying the content.

At act 306 the computing device displays a control area on the touch screen. In some embodiments, the control area may be displayed adjacent to the viewing area, such that the control area frames the viewing area.

At act 308 the computing device receives a touch input via the touch screen. The touch input may be characterized by parameters. The parameters characterizing the touch input may include a location of initial contact between a touch instrument and the touch screen. The parameters may further include a location, speed, direction, and/or trajectory of the touch instrument's motion across the touch screen, and a location of final contact between the touch instrument and the touch screen.

At act 310 the computing device determines whether the initial contact between the touch instrument and the touch screen is in the control area. In some embodiments, this determination is made by a generic TIE in the operating system. In other embodiments, a different component of the operating system or a component outside the operating system may make this determination.

At act 314 the computing device determines whether the initial contact between the touch instrument and the touch screen is in the viewing area. If so, at act 320 the computing device provides the touch input to the application supplying the content displayed in the viewing area. If the initial contact is not in the control area and not in the viewing area, the computing device provides the touch input to the operating system or to an application associated with the area in which the initial contact occurred as act 322. At act 312, having determined that the initial contact of the input touch is in the control area, the computing device determines whether the input touch includes a subsequent motion across the touch screen. Swipes and pincer motions are examples of input touches that include subsequent motion across the touch screen. Taps and presses are examples of input touches that do not include subsequent motion across the touch screen.

If the input touch does not include subsequent motion across the touch screen, at act 316 the computing device 100 alters the appearance of the content in the viewing area in response to the input touch. In some embodiments, if the input touch is a tap or press along a portion of the control area adjacent to a left side of the viewing area, the computing device pans the content in the viewing area from left to right.

If the initial contact of the input touch is in the control area (see act 310), and the input touch includes a subsequent motion across the touch screen (see act 312), at act 318 the computing device 100 performs direct manipulation of the content displayed in the viewing area in response to the user's input touch. In some embodiments, examples of direct manipulation include panning, panning with inertia, zooming in, and zooming out in response to dragging, flicking, spreading, and pinching, respectively.

At least some of the acts illustrated in FIG. 13 may be performed simultaneously or in an order other than the order depicted in FIG. 13. For example, embodiments may perform the act 306 of displaying a control area on the touch screen prior to performing the act 304 of displaying at least a portion of the content in a viewing area on the touch screen.

Having thus described several aspects of at least one embodiment of this invention, it is to be appreciated that various alterations, modifications, and improvements will readily occur to those skilled in the art.

For example, it was described that a user may provide a touch input with one or more digits, such as a finger or thumb. However, the specific mechanism by which a user provides a touch input is not critical to the invention. For example, a user may provide inputs through the use of a stylus or other suitable device.

Further, it is described that a computing device responds to touch input. It should be appreciated that a computing device need not detect "touch" through sensing pressure or contact with the surface of the touch screen. In some embodiments, interfaces regarded as "touch screens" may detect a touch input by sensing capacitance associated with a finger or object in vicinity of the touch screen. In some embodiments, interfaces regarded as "touch screens" may detect a touch input by sensing motion or position of a finger or object within a sensed region, irrespective of any relationship between a location of the sensed region and a location of the display. Accordingly, any suitable devices that detect presence, position, and/or motion of an object and use the detected presence, position, and/or motion to control a display may be regarded as touch screens.

As yet a further variation, it is described that the control area remains on the touch screen continuously as content is displayed. Though, it should be appreciated that the control area may be displayed selectively based on a detected user context. The control area may be displayed for example only in contexts in which the use is likely to issue a command. For example, the control area may appear when acceleration or other sensors on the computing device output values indicating that the user has picked up the computing device.

The context of the content to display may also be used by the touch screen interface component to determine the configuration of the control area. As a specific example of determining configuration of the control area based on content, the control area may be presented only along an edge if the content includes further information that could be displayed if the content is panned in the direction of that edge. In this way, selectively configuring the control area may indicate to a user what manipulation operations are available in a specific context.

As another example of a possible variation, FIG. 12 illustrates a single processing unit. A computing device may include multiple general purpose processing units and/or multiple special purpose processing units. Though not shown, the computing device may include a graphic processing unit to render information for display on touch screen 200.

As an example of yet another variation, multiple possible formats of a control area were illustrated. Other formats are possible. As an example of another variation, in a scenario in which an application is using a viewing area that occupies only a portion of the display area on the screen, the control area may border the portion of the screen actively being used to display content rather than bordering the edges of the screen.

As an example of yet another variation, the foregoing figures and paragraphs illustrate a single control area corresponding to a single viewing area on the touch screen. A touch screen may display a plurality of control areas, with each of the plurality of control areas corresponding to one of a plurality of viewing areas, and each viewing area displaying content provided or generated by a plurality of applications.

Further, an embodiment was described in which the operating system performs processing of touch inputs to differentiate between commands to manipulate the presentation of content in a viewing area and inputs to interact with that content. In some embodiments, an application or other component may perform that processing. Such an application, for example, may include a specific touch interface engine to perform preliminary processing as is performed in the generic touch interface engine described above.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of displaying content on a mobile computing device that includes a touch screen that is both an input and an output device, the method comprising:
   displaying a control area and a viewing area on the touch screen, where the control area and the viewing area are separate from each other;
   displaying the content in the viewing area of the touch screen;
   receiving, via the touch screen, a touch input;
   altering in a first manner, in response to the received touch input originating in the control area that includes subsequent dragging motion on the touch screen into the viewing area, an appearance of the content displayed in the viewing area as opposed to altering in a second manner the appearance of the content displayed in the viewing area or performing an interaction with the content displayed in the viewing area, where the altering in the first manner the appearance of the content corresponds to the subsequent dragging motion on the touch screen into the viewing area;
   altering in the second manner, in response to the received touch input originating in the control area that does not include subsequent dragging motion on the touch screen, the appearance of the content displayed in the viewing area as opposed to altering in the first manner the appearance of the content displayed in the viewing area or performing the interaction with the content displayed in the viewing area, where the altering in the second manner the appearance of the content is not dependent on any subsequent dragging motion on the touch screen; and
   performing, in response to the received touch input that originates in the viewing area, the interaction with the content displayed in the viewing area as opposed to altering in the first manner the appearance of the content displayed in the viewing area or altering in the second manner the appearance of the content displayed in the viewing area.

2. The method of claim 1, where the control area circumscribes the viewing area and is circumscribed by a border of the touch screen.

3. The method of claim 1, where the displaying the control area comprises displaying the control area as at least two portions, a first of the at least two portions being disposed along a first side of the touch screen and a second of the at least two portions being disposed along a second side of the touch screen.

4. The method of claim 1, where:
   the touch input originating in the control area that includes subsequent dragging motion on the touch screen into the viewing area comprises a swipe; and
   the altering in the first manner the appearance of the content displayed in the viewing area comprises displaying, in response to the swipe, at least some other content in the viewing area.

5. The method of claim 4, where:
   the swipe comprises a drag; and
   the other content is panned in the viewing area without inertia.

6. The method of claim 4, where:
   the swipe comprises a flick; and
   the other content is panned in the viewing area with inertia.

7. The method of claim 1, where:
   the touch input originating in the control area that includes subsequent dragging motion on the touch screen into the viewing area comprises a pincer touch that originates in the control area; and the altering in the first manner the appearance of the content displayed in the viewing area comprises altering, in response to the pincer touch, a magnification of the content displayed in the viewing area.

8. The method of claim 7, where:
the pincer touch comprises a pinch; and
the altering the magnification of the content in the viewing area comprises zooming out, in response to the pinch, in the viewing area.

9. The method of claim 7, where:
the pincer touch comprises a spread; and
the altering the magnification of the content in the viewing area comprises zooming in, in response to the pinch, in the viewing area.

10. The method of claim 1, where:
the touch input originating in the control area that does not include subsequent dragging motion on the touch screen comprises a tap that originates in the control area; and
the altering in the second manner the appearance of the content displayed in the viewing area comprises altering, in response to the tap, a magnification of the content displayed in the viewing area.

11. The method of claim 1, where:
the touch input originating in the control area that does not include subsequent dragging motion on the touch screen comprises a tap that originates in the control area;
the altering in the second manner the appearance of the content displayed in the viewing area comprises panning, in response to the tap, the content displayed in the viewing area.

12. The method of claim 1, where:
the touch input originating in the control area that does not include subsequent dragging motion on the touch screen comprises a press that originates in the control area;
the altering in the second manner the appearance of the content displayed in the viewing area comprises panning, in response to the press, the content displayed in the viewing area for a duration of the press.

13. At least one computer readable storage medium encoded with instructions that, based on execution by at least one processor of a computer that includes a touch screen that is both an input and an output device, configure the computer to perform actions comprising:
displaying a control area and a viewing area on the touch screen, where the control area and the viewing area are separate from each other;
displaying content in the viewing area of the touch screen;
receiving, via the touch screen, a touch input;
altering in a first manner, in response to the received touch input originating in the control area that includes subsequent dragging motion on the touch screen into the viewing area, an appearance of the content displayed in the viewing area as opposed to altering in a second manner the appearance of the content displayed in the viewing area or performing an interaction with the content displayed in the viewing area, where the altering in the first manner the appearance of the content corresponds to the subsequent dragging motion on the touch screen into the viewing area;
altering in the second manner, in response to the received touch input originating in the control area that does not include subsequent dragging motion on the touch screen, the appearance of the content displayed in the viewing area as opposed to altering in the first manner the appearance of the content displayed in the viewing area or performing the interaction with the content displayed in the viewing area, where the altering in the second manner the appearance of the content is not dependent on any subsequent dragging motion on the touch screen; and
performing, in response to the received touch input that originates in the viewing area, the interaction with the content displayed in the viewing area as opposed to altering in the first manner the appearance of the content displayed in the viewing area or altering in the second manner the appearance of the content displayed in the viewing area.

14. The at least one computer readable storage medium of claim 13, where the control area on the touch screen comprises a plurality of bands, each band being disposed adjacent an edge of the touch screen.

15. The at least one computer readable storage medium of claim 13, where the control area on the touch screen comprises a region circumscribed by the viewing area.

16. The at least one computer readable storage medium of claim 13 where the control area circumscribes the viewing area and is circumscribed by a border of the touch screen.

17. A computing device configured for displaying content, the computing device comprising:
a touch screen that is both an input and an output device;
a processor;
a non-volatile storage device storing computer-executable instructions that, based on execution by the processor, configure the computing device to perform actions comprising:
displaying a control area and a viewing area on the touch screen, where the control area and the viewing area are separate from each other;
displaying the content in the viewing area of the touch screen;
receiving, via the touch screen, a touch input;
altering in a first manner, in response to the received touch input originating in the control area that includes subsequent dragging motion on the touch screen into the viewing area, an appearance of the content displayed in the viewing area as opposed to altering in a second manner the appearance of the content displayed in the viewing area or performing an interaction with the content displayed in the viewing area, where the altering in the first manner the appearance of the content corresponds to the subsequent dragging motion on the touch screen into the viewing area;
altering in the second manner, in response to the received touch input originating in the control area that does not include subsequent dragging motion on the touch screen, the appearance of the content displayed in the viewing area as opposed to altering in the first manner the appearance of the content displayed in the viewing area or performing the interaction with the content displayed in the viewing area, where the altering in the second manner the appearance of the content is not dependent on any subsequent dragging motion on the touch screen; and
performing, in response to the received touch input that originates in the viewing area, the interaction with the content displayed in the viewing area as opposed to altering in the first manner the appearance of the content displayed in the viewing area or altering in the second manner the appearance of the content displayed in the viewing area.

18. The computing device of claim 17, where:

the touch input originating in the control area that includes subsequent dragging motion on the touch screen into the viewing area comprises a swipe; and the altered appearance in the first manner of the content displayed in the viewing area is based on panning to display alternative content in the viewing area.

* * * * *